INVENTORS
ARTHUR F. KITTREDGE
CHARLES E. JOOS
BY
John E. Hubbell
ATTORNEY

July 10, 1951     C. E. JOOS ET AL     2,560,226
HEATING, DEAERATING AND PURIFYING WATER
Filed Oct. 25, 1945     2 Sheets-Sheet 2
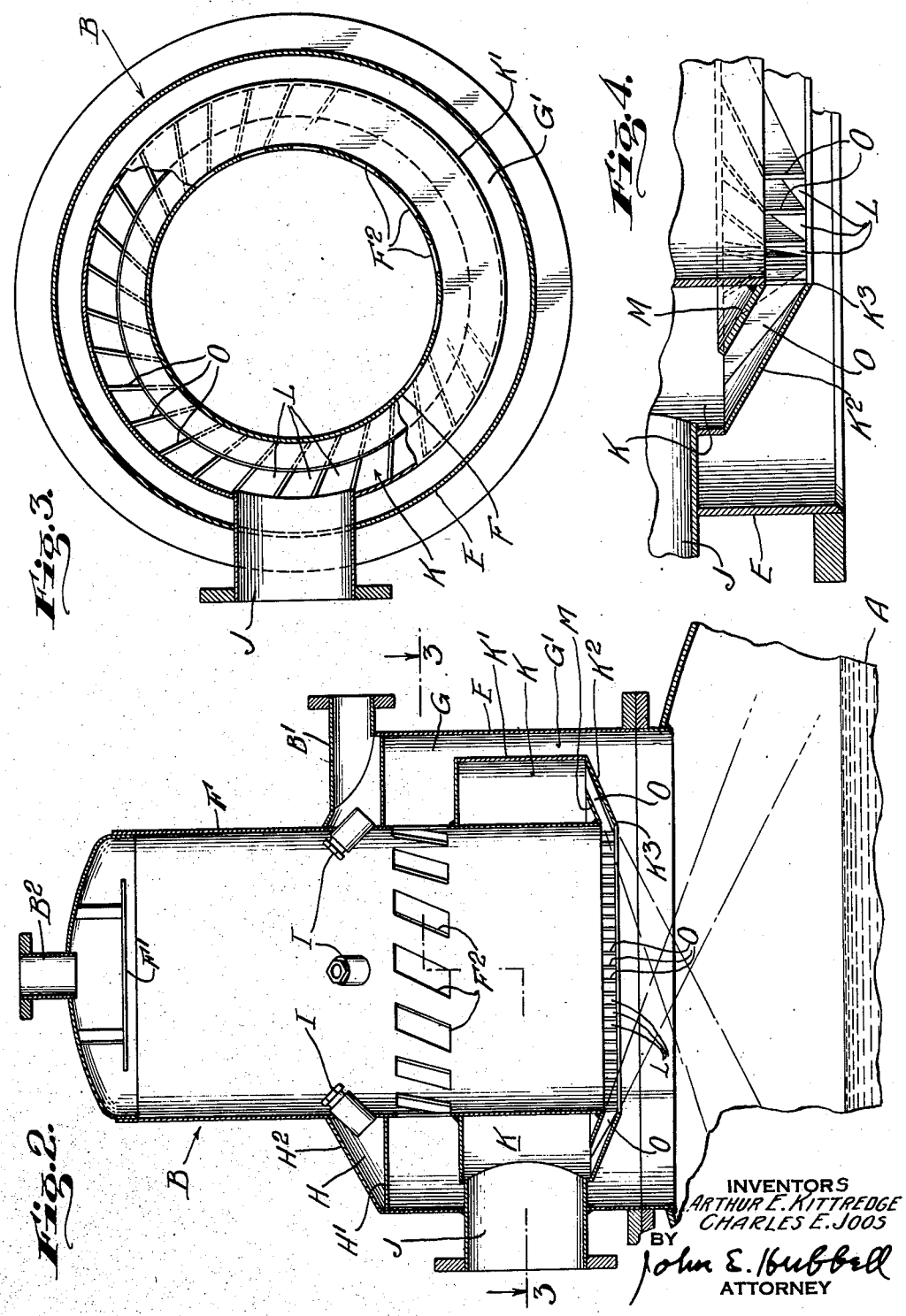
INVENTORS
ARTHUR E. KITTREDGE
CHARLES E. JOOS
BY
John E. Hubbell
ATTORNEY Patented July 10, 1951

2,560,226

UNITED STATES PATENT OFFICE 2,560,226

HEATING, DEAERATING, AND PURIFYING WATER

Charles E. Joos, Wyncote, Pa., and Arthur E. Kittredge, Audubon, N. J., assignors to Cochrane Corporation, Philadelphia, Pa., a corporation of Pennsylvania Application October 25, 1945, Serial No. 624,348

2 Claims. (Cl. 183—2.5)

The general object of the present invention is to provide improved apparatus for heating and deaerating water of the known type in which water is heated and deaerated in two stages, namely in an initial stage in which the water is brought into contact with steam and is heated nearly to its final temperature and has its air content made very small, and in a second stage to which the steam utilized in heating and deaerating the water is initially supplied and in which the steam is utilized in atomizing and scrubbing and thereby completing the heating and deaerating of the water and from which the uncondensed steam is passed to the first stage.

Another general object of the present invention is to combine water heating, deaerating and softening method steps and apparatus elements to cooperate in heating and deaerating water in two such stages as are described above, and to thereafter subject the heated and deaerated water to a hot process water softening treatment in which impurities, precipitated from the water as a result of its heating and of the addition to the water of chemical softening material, are separated from the water by sedimentation.

The present invention is of especial utility in treating water having a carbonate hardness in excess of 50 P. P. M. (fifty parts per million). During the last dozen years or so, many successful installations of water treating apparatus have been made in this country in which the water is heated and deaerated as above described, and in which the water is subjected to the hot process softening treatment. In all of such installations of which we have knowledge, however, in which the carbonate hardness of the water has exceeded 50 P. P. M., the water has been subjected to the hot process water softening treatment after its subjection to the first stage, but prior to its subjection to the second stage of the above described two stage water heating and deaerating treatment. This resulted in an elimination of precipitated impurities prior to the atomization stage of deaeration which was made practically essential in the prior installations, by their inclusion of means employed to segregate the two stages of the water heating and deaerating treatment. Such segregating means would be rendered practically inoperative by impurities if water having high carbonate hardness were passed into the atomizing stage prior to its hot process purification.

In prior two stage water heating and deaerating installations subjecting the water to hot process water softening treatment, it has been customary to segregate the two stages, either by providing a water seal in the path of water movement from the first stage into the second stage, or by the use of baffle and partition means providing a restricted path of water movement from the first stage into the second stage while avoiding an accompanying flow of steam and liberated gases from the first stage into contaminating admixture with the atomizing steam in the second stage. Neither of those arrangements for segregating the two stages in the hot process treatment of water having carbonate hardness above 50 P. P. M. is practically usable unless impurities are precipitated out of such water before it passes through the stage segregating means. Without such precipitation the segregating means will quickly be made practically inoperable by the deposition of impurities rendered insoluble by the heating of the water in the first deaerating stage, even though no chemical softening material be added to the water prior to its passage through and away from the first stage.

A specific but practically important object of the present invention is to provide two stage water heating and deaerating apparatus comprising first and second stage spaces in such free communication that drops of water may be gravitationally moved directly into the second stage space from substantially any point in the first stage space, and in which steam flow and pressure conditions are maintained in the two stages which prevent significant flow from the first stage space into the second stage space of steam and gases separating in the first stage space from the water heated therein.

Another specific object of the invention is to so form and combine the water heating and deaerating apparatus and the sedimentation tank required for the softening operation, that the steam space in the upper portion of the sedimentation tank may constitute a portion at least of the second deaeration stage space which is directly beneath and is of greater horizontal extent than the open lower end of the heating chamber. With the apparatus so formed and arranged, the average length of the path along which the atomizing steam travels with atomizing velocity, may be made desirably long without correspondingly increasing the horizontal extent of the deaerating apparatus above the sedimentation tank.

The various features of novelty which characterize our invention are pointed out with particularity in the claims annexed to and forming a part of this specification. For a better understanding of the invention, however, its advantages, and specific objects attained with its use, reference should be had to the accompanying drawing and descriptive matter in which we have illustrated and described a preferred embodiment of the invention.

Of the drawings:

Fig. 2 is a sectional elevation on an enlarged scale of the upper portion of the apparatus shown in Fig. 1;

Fig. 3 is a partial section on the line 3—3 of Fig. 2; and

Fig. 4 is an enlarged reproduction of a portion of Fig. 2 with parts shown in more detail.

Figure 1:
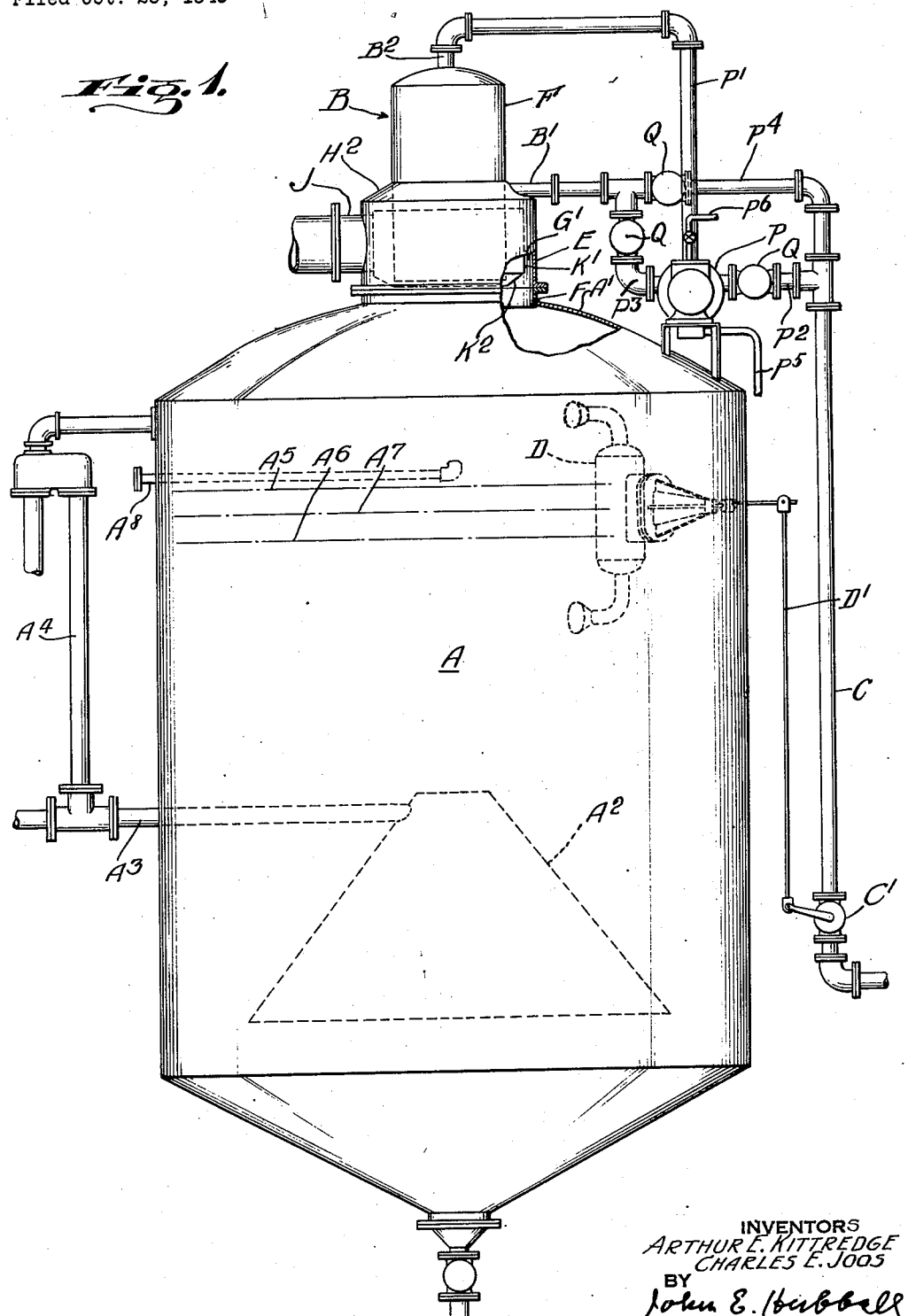
Fig. 1 is an elevation of water heating, deaerating and softening apparatus.

The apparatus embodiment of our invention illustrated herein by way of example, includes a sedimentation tank A, at the upper end of which a water heating and deaerating tank structure B is mounted. The sedimentation tank, except in respect to its association with the tank B, may be of commercial type and form. As shown, the tank B passes heated water into the tank A through a large inlet opening in its top wall A'. The treated water is withdrawn from the tank A through a drawoff connection including an inverted cone $A^2$ in the lower portion of the tank, and an outlet pipe $A^3$ opening from the upper end of the space within the cone.

Water is supplied to the tank B and thereby to the tank A through a supply pipe C which discharges into the tank B through the water inlet nozzle B' at a rate regulated by a supply valve C' in the pipe C. The valve C' is automatically adjusted in response to variations in the water level in the tank A, by the customary means shown as comprising a float box D and an operating connection D' between the float box and valve. Overflow outlet piping $A^4$ prevents the water level in tank A from rising much above the level of the line $A^5$. In normal operation the water level in the tank A is at or adjacent the line $A^7$ which is intermediate the line $A^6$ at which the valve is wide open and the line $A^5$ at which said valve is fully closed. In practice the sedimentation tank A will be provided with manholes, inspection openings, a vacuum breaker and other accessories and features not illustrated or described herein as they form no part of our invention and are not essential to its use. It is practically important, however, that in normal operation the water level in the tank A should be low enough to provide a steam space in the upper portion of the tank A of sufficient depth form a suitable extension of the second stage deaerating space in the tank B.

In the preferred construction shown, the heating and deaerating tank B comprises an outer wall having its lower portion formed by a cylinder E and having its upper portion formed by the upper portion of a cylinder F smaller in diameter than, and coaxial with the cylinder E. As shown, the open lower end of the cylinder E extends for a short distance through a central opening in the top wall A' of the tank A, and is welded to the latter at the margin of said opening. The lower end of the cylinder E thus directly forms the water inlet to the tank A. An annular steam space G surrounds the cylinder F and the hereinafter described steam chamber K. The upper end of the space G is closed by the bottom wall H' of an annular raw water feed chamber H. The latter has an inclined top wall $H^2$ and has its inner wall formed by the cylinder F. The water inlet nozzle B' of the tank B discharges into the chamber H through an opening in the top wall $H^2$. The water in the chamber H is under such pressure that it may be sprayed into the upper portion of the space surrounded by the cylinder F through spray nozzle members I which may be of known type and extend through and are anchored in the cylinder F. The nozzles I are arranged to discharge the water passing through them in upwardly directed jets. The water thus jetted into the tank B is prevented from reaching the vent opening $B^2$ at the top of the tank by a suspended baffle F'.

Steam flowing upward through the annular space G as hereinafter described, passes into the space surrounded by the cylinder F through openings $F^2$ in the cylinder F arranged in a circular series immediately below the level of the bottom wall of the water chamber H. Advantageously and as shown, the ports $F^2$ are of trapezoidal shape, having horizontal top and bottom edges and having their other edges inclined to the vertical so that steam jets entering the cylinder F through the ports $F^2$ form a steam veil or curtain extending across the cylinder F. The water sprayed into the cylinder F and dropping down from its upper end wall and from the baffle F' pass through said steam veil or curtain.

The steam for heating and deaerating the water treated in the apparatus is supplied to the tank B through a lateral steam nozzle J. The latter extends through the cylinder E and part way through the space G and opens into an annular steam chamber K coaxial with and surrounding the lower portion of the cylinder F. The outer wall K' of the chamber K is cylindrical and is separated from the cylinder E by an annular portion of the steam channel G of smaller radial extent than the upper portion of the channel from which the ports $F^2$ open. The upper wall of the steam chamber K is horizontal, and as shown is formed by an annulus welded at its inner edge to the cylinder F and at its outer edge to the upper edge of the cylindrical wall K'. The lower wall $K^2$ is in the form of a frustum of a hollow cone having its upper edge welded to the lower edge of the cylinder outer wall K' of the chamber K.

The lower edge of the wall $K^2$ is of a diameter approximately equal to the diameter of the cylinder F and is below the lower end edge of the cylinder F, so that the lower end of the cylinder F and the lower edge of the wall $K^2$ form the upper and lower edges, respectively, of an annular space through which steam is discharged from the chamber K into the space directly beneath the cylinder F.

Advantageously, the steam is discharged from the chamber K in the form of a multiplicity of definitely directed jets. To this end in the construction shown the space immediately above the conical wall $K^2$ of the steam chamber K is divided into a plurality of nozzle passages L. The bottom walls of the various nozzle passages L are formed by the conical wall $K^2$ and their top walls are formed by a conical baffle M which may have the same conical angle as the wall. The side walls of the passages are formed by vertical parts O shown as metal plate sections having their lower edges welded to the conical wall $K^2$ and welded at their upper edges to the lower side of the conical member M. Each part O separates and forms a side wall for each of two adjacent nozzle passages. The lower edge of the latter surrounds and is welded to the lower edge of the cylinder F. As shown, the upper ends of the part O are bevelled off so as to be flush with the horizontal surface including the inner section of the cylinder and bottom walls K' and K² of the steam chamber. Advantageously, and as shown, the nozzle wall parts O are so disposed that the steam jets discharged from diametrically opposed portions of the chamber K are laterally displaced from one another. To this end in the arrangement shown the planes of the different parts O are tangential to a cylinder coaxial with the chamber E and substantially smaller in diameter than the latter.

The gases separated from the water in the deaeration treatment are withdrawn from the chamber F in an admixture with some of the steam supplied to the apparatus. In the construction shown the gas and steam mixture passes out of the chamber F through the nozzle B² into a pipe P' leading to the vapor inlet of a vent condenser P which may be of conventional form. As shown, the water treated normally passes from the supply pipe C through a pipe P² to the water inlet of the condenser P. The latter has its water outlet P³ connected to the water inlet B' of the heating and deaerating apparatus. As shown, a by-pass P⁴ is provided for the passage of water directly from the pipe C to the inlet B' when the condenser P is cut out of service for repairs or other cause. Each of the pipes P², P³ and P⁴ is shown as including a by-pass valve Q.

Water of condensation formed in the vent condenser P passes away from the latter through a condenser drain pipe P⁵. As conditions make desirable, the drain pipe P⁵ may arranged to discharge to waste, or to a hot returns tank (not shown) for separate deaeration, or, when the vent condenser is suitably elevated, the drain pipe may discharge into the tank B in the manner disclosed, for example, in the Joos and Gibson Patent 2,101,908 of December 14, 1937, for deaeration of the condensate along with the makeup water supplied through pipe C. The vent condenser is provided with an outlet P⁶ for the discharge of gases. When the steam pressure in the chamber F is above the pressure of the atmosphere, as it will be in many installations, the gas discharge pipe P⁶ may open directly into the atmosphere. When the pressure in the chamber F is below the pressure of the atomsphere, as it may be in some cases, a vacuum pump or jet ejector (not shown) may be connected to the gas outlet P⁶ to draw the liberated gases from the vent condenser.

It is to be noted that hereinbefore we have used the term "deaeration" in accordance with the most usual practice of the art, although the term "degasification" is a more accurately comprehensive term. While it is customary to refer to water in contact with the atmoshpere as "holding air in solution" it is generally recognized that the oxygen and nitrogen and other gaseous constituents of the atmosphere separately pass into solution in water in contact with the air.

In the normal contemplated operation of the apparatus shown, water passes into the water chamber H at a rate controlled by the valve C'. The latter is automatically adjusted in a manner tending to maintain the water level at the top of the sedimentation space between the levels indicated by the lines A⁵ and A⁶. The water supplied to the chamber H is under sufficient pressure to insure that the spray nozzles I will pass the water into the upper portion of the chamber F in suitably fine upwardly directed spray jets. The finely divided water thus sprayed into the steam atmosphere in the chamber F, is heated practically instantaneously to within a degree or so of the temperature at which steam is supplied through the nozzle J to the steam chamber K. This heating of the finely divided water separates therefrom all but a relatively small fraction of its original gas content.

The finely divided water sprayed through the nozzles I into the chamber F, impinges against the surrounding wall of the chamber F and against the baffle F' and then moves downward under the action of gravity, partly in the form of falling drops, and partly in the form of a water film on the cylindrical enclosing wall of the chamber. When the downflowing water film on the inner surface of the wall F reaches the level of the ports F², the steam entering through those ports breaks up the film water into particles which are distributed throughout the space surrounded by the ports F². In consequence, practically all of the water moving downward through the portion of the chamber below the ports F² reaches the open lower end of the chamber in the form of rain or drops distributed more or less uniformly across the cross-section of the chamber.

As the falling drops of water pass into the path of the steam jets discharged from the chamber K through the nozzle passages L, they are atomized or subdivided to mistlike fineness by the atomizing action of the steam jets. This fine subdivision of the water while enveloped in an atmosphere of steam mixed with only a minute amount of gas, heats the water substantially to the full temperature of the steam, and separates from the water all but an infinitesimal portion of the small amount of air in the water drops passing out of the lower end of the chamber F.

For the thorough atomization of the water dropping into the path of the steam jets issuing from the nozzles L, those jets should have an atomizing velocity. As shown, each nozzle L tapers in transverse cross-section, diminishing both in width and depth from its inlet and to its outlet end. The taper form of the nozzles contributes to a desirably high nozzle exit velocity. With the arrangement shown, the atomizing action of the steam jets is effected mainly in the zone directly beneath the chamber F, but the water and air separating action continues and is completed in the space underlying the tank roof wall A' surrounding the chamber G. With the arrangement shown, the velocity of the steam jets is reduced relatively slowly until after the steam has moved across the space directly beneath the chamber F. The steam may thus exert some atomizing action on the water drops with which it is in contact after passing into the space beneath the portion of the tank roof wall A' surrounding the chamber G.

A chemical softening agent may be sprayed into the steam space of the tank A through pipe A⁸ or introduced into the apparatus in some other well known or suitable way. No means for use in introducing chemicals into the apparatus is shown as such means may be of well known form. In general, the amount of steam passing into the apparatus through the inlet nozzle J will be approximately proportional to the amount of water supplied to the chamber H, as a result of the fact that the water heating apparatus is of the induction type. In consequence, the amount of energy in the steam available for use in atomizing each pound of water treated, will be lower at part load than at full load. However, practically adequate deaeration is obtainable with the apparatus shown when aperating at a load substantially below full load without requiring an excessive steam pressure drop through the steam nozzles at full load.

It is to be noted that while the static pressure of the steam is reduced as it passes through the nozzle passages L, much of such static pressure reduction is recovered when the jet velocity of the steam is dissipated in the outer portion of the steam space above the body of water in the tank A. This pressure recovery contributes to the maintenance of steam pressure conditions in different portions of the apparatus which insure the required upflow of steam through the space G', and prevent significant downflow of steam through the portion of the chamber F at and below the level of the ports $F^2$. Such downflow would be objectionable because of the inevitable admixture with the downflowing steam of gases separated from the water in the portion of the chamber F above the ports $F^2$.

As those skilled in the art will understand, the dimensions of apparatus of the type shown provided for use in the practice of our invention, may vary widely. It is noted by way of illustration and example, and not by way of limitation, that the diameter of the chamber F may be expected to vary in ordinary practice from about eighteen inches in the case of a very small unit, to about eight feet in the case of a relatively large unit, and that the ratio of the diameter of the tank A to the diameter of the chamber F may well be approximately the same as that shown in Fig. 1 in units of all sizes. The vertical dimensions of the main cylindrical wall of the tank A may well be of the order of twenty or twenty-one feet in units of all size.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent, is:

1. Two stage water heating and deaerating apparatus comprising a heating chamber in the form of a vertically disposed cylinder having its lower end open and unobstructed and comprising a second chamber larger in horizontal cross-section than said heating chamber and having an upper portion surrounding the lower portion of said heating chamber and a lower portion beneath the level of the lower end of said heating chamber, water supply means comprising spray nozzles mounted in the wall surrounding the heating chamber and arranged to spray water into the upper portion of said heating chamber, and steam supply means arranged to discharge jets of steam into the second chamber space directly beneath the heating chamber from the periphery of the last mentioned chamber, the wall of said heating chamber having ports through which steam may pass into said chamber from the upper portion of said second chamber.

2. Apparatus as specified in claim 1 in which the steam supply means comprise nozzle passages through which said jets of steam are discharged and each shaped to direct the jet which it discharges to one side of the axis of said heating chamber.

CHARLES E. JOOS.
ARTHUR E. KITTREDGE.

REFERENCES CITED

The following references are of record in the file of this patent:

UNITED STATES PATENTS

| Number | Name | Date |
|---|---|---|
| 1,078,655 | Alliger et al. | Nov. 18, 1913 |
| 1,943,890 | Gibson et al. | Jan. 16, 1934 |
| 1,969,278 | Rohlin | Aug. 7, 1934 |
| 2,047,291 | Rohlin | July 14, 1936 |
| 2,160,832 | Contant | June 6, 1939 |

OTHER REFERENCES

Cochrane Publication #2690, Deaeration by Atomization, May 26, 1937.